United States Patent [19]

Kordomenos

[11] Patent Number: 4,536,558
[45] Date of Patent: Aug. 20, 1985

[54] CHAIN EXTENDED EPOXY-ESTER POLYMERIC COMPOSITIONS FOR CATIONIC ELECTRODEPOSITION

[75] Inventor: Panagiotis I. Kordomenos, Mt. Clemens, Mich.

[73] Assignee: Ford Motor Company, Dearborn, Mich.

[21] Appl. No.: 598,553

[22] PCT Filed: Dec. 27, 1983

[86] PCT No.: PCT/US83/02034
§ 371 Date: Dec. 27, 1983
§ 102(e) Date: Dec. 27, 1983

[51] Int. Cl.$^3$ .............. C08G 59/24; C25D 13/06
[52] U.S. Cl. ................... 528/100; 528/119; 528/120; 528/45; 204/181.7; 524/904; 523/415; 523/417; 523/418
[58] Field of Search ............... 528/100, 119, 45, 120; 204/181 C; 524/904; 523/415, 417, 418

[56] References Cited

U.S. PATENT DOCUMENTS

| | | | |
|---|---|---|---|
| 3,640,926 | 2/1972 | Slater | 523/414 |
| 3,719,626 | 3/1973 | May | 523/414 |
| 3,922,253 | 11/1975 | Jerabek et al. | 528/45 |
| 3,947,338 | 3/1976 | Jerabek et al. | 204/181 C |
| 4,093,594 | 6/1978 | Anderson | 204/181 C |
| 4,104,147 | 8/1978 | Marchetti et al. | 204/181 C |
| 4,116,900 | 9/1978 | Belanger | 523/414 |
| 4,120,768 | 10/1978 | Gibson et al. | 204/181 C |
| 4,137,140 | 1/1979 | Belanger | 204/181 C |
| 4,139,510 | 2/1979 | Anderson | 204/181 C |
| 4,148,772 | 4/1979 | Marchetti et al. | 528/110 |
| 4,182,831 | 1/1980 | Hicks | 528/103 |
| 4,182,833 | 1/1980 | Hicks | 528/103 |
| 4,212,779 | 7/1980 | Schmalzer et al. | 204/181 C |
| 4,246,087 | 1/1981 | Tsov et al. | 204/181 C |
| 4,292,155 | 9/1981 | Bosso et al. | 204/181 C |
| 4,294,940 | 10/1981 | Hino et al. | 528/45 |
| 4,302,373 | 11/1981 | Steinmetz | 524/901 |
| 4,396,649 | 8/1983 | Bailey et al. | 204/181 C |

Primary Examiner—John Kight
Assistant Examiner—Garnette D. Draper
Attorney, Agent, or Firm—Lorraine S. Melotik; Roger L. May

[57] ABSTRACT

This invention relates to water dispersible, cathodically electrodepositable resins which are prepared by reacting chain extended polyepoxides with secondary amines. The polyepoxides have been chain extended with polycarboxylic acids. The resin is dispersible in water with the aid of a water soluble acid to provide cationic groups in the resin. Preferred crosslinking agents for the resin comprises capped isocyanates which may be either incorporated in the resin or preferably co-deposited with the resin from the coating composition bath.

14 Claims, No Drawings

CHAIN EXTENDED EPOXY-ESTER POLYMERIC COMPOSITIONS FOR CATIONIC ELECTRODEPOSITION

TECHNICAL FIELD

This invention relates to the synthesis of chain extended epoxy-ester resins suitable for cationic electrodeposition. The resins are formed by first chain extending high molecular weight polyepoxides with polyfunctional acid compounds, to form epoxide functional esters which are subsequently reacted with secondary amine. The resins are made water dispersible via neutralization with an acid and crosslinked, during curing on the substrate, preferably with the aid of blocked isocyanates derivatives.

BACKGROUND ART

The coating of electroconductive substrates by electrodeposition is an important industrial process. In this process, a conductive article is immersed as one electrode in a coating composition made from an aqueous dispersion of film-forming polymer. An electric current is passed between the article and a counter electrode in electrical contact with the aqueous dispersion until a desired amount of coating is produced on the article. The article to be coated can made the anode or the cathode depending upon the ionic nature of the coating system.

Cationic coating compositions generally are derived from resinous compositions containing a basic nitrogen atom which can be neutralized with an acid and then be dissolved or dispersed in water. Sufficient basic nitrogen atoms should be present so that the dispersibility or solubility can be obtained with a minimum amount of acid. The most commonly employed type of cathodically electrode depositable resins are made by reacting a polyepoxide resin with amine at elevated temperatures, as exemplified in U.S. Pat. No. 4,137,140 to Belanger, U.S. Pat. No. 4,182,831 to Hicks, and U.S. Pat. Nos. 3,922,253 and 3,947,338 to Jerabek et al. Marchetti et al in U.S. Pat. No. 4,104,147 disclose chain-extended polyepoxide which is adducted with a secondary amine, wherein the chain-extended polyepoxide is made by reacting a high molecular weight epoxide with an organic polyol. May, in U.S. Pat. No. 3,719,626 discloses amine adducts of polyepoxides, wherein the polyepoxide includes epoxidized polyesters obtained by reacting an unsaturated polyhydric alcohol and/or an unsaturated polycarboxylic acid. Aqueous coating compositions of these resins are made by reacting the resin with a water soluble acid and subsequently dispersing the resin in water. The coating compositions are deposited on a substrate and crosslinked at elevated temperatures by means of an agent which is capable of reacting with the hydroxyl or amine functionality of the resin during curing to form a thermoset film. The crosslinking agent, which is generally a blocked isocyanate, may be incorporated into the resin molecule as is taught in the Jerabek et al patents or, as is more generally the case, the crosslinking agent may be present in the aqueous coating bath so as to codeposit with the resin.

DISCLOSURE OF THE INVENTION

The compositions of this invention are water dispersible, cathodically electrodepositible resins. These resins are characterized in that they comprise the reaction product of: (A) epoxide functional esters and (B) secondary amines, wherein the ester and the amines are reacted in amounts sufficient to react essentially all of the epoxide groups of the ester with the amides. The epoxide functional ester (A) is formed by chain extending (a) polyepoxide having (i), on average, at least 2, and preferably only 2, epoxide groups per molecule and (ii) a molecular weight of at least about 350 with (b) polycarboxylic acid bearing at least 2, and preferably only 2, carboxyl groups per molecule. The polyepoxide and polycarboxylic acid are reacted in amounts sufficient to provide between about 0.1 and about 0.8 acid groups per epoxide groups. The resin is dispersible in water with the aid of water soluble acid to provide cationic groups in the resins.

Crosslinking of the resin during curing preferably takes place by means of blocked (i.e., capped) isocyanate groups which may be incorporated into the resin molecule or, more preferably, by means of a fully blocked isocyanate which is codeposited with the resin from the coating bath.

This application is directed to the resin described above as well as to an aqueous coating composition comprising these resins.

It has now been found that resins formed from polyepoxides which have been chain extended with polycarboxylic acids according to this invention, as compared to prior art resins, particularly those made from diol extended polyepoxides, provide coating compositions with improved flexibility, excellent adhesion over oily steel substrates, and higher rupture voltages on electrodeposition.

BEST MODE FOR CARRYING OUT THE INVENTION

The invention of this application is directed to a cathodically electrodepositable, water dispersible, resin as has been described briefly above. Each of the components employed in making this resin will hereinafter be described in detail.

The polyepoxide utilized to form the electrodepositable resins of this invention is a polymeric material containing two or more epoxy groups per molecule, and preferably two per molecule wherein, additionally, the epoxide groups preferably are terminal epoxide groups. The polyepoxides are of relatively high molecular weight having molecular weights of at least 350, preferably within the range of 350 to 2000. The polyepoxides can be essentially any of the well-known types such as polyglycidyl ethers of polyphenols, for example, bisphenols such as Bisphenol A. These can be produced by etherification of a polyphenol with epihalohydrin in the presence of alkali. The phenolic compound may be bis(4-hydroxyphenyl)-2,2-propane, 4,4'-dihydroxybenzophenone, bis-(4-hydroxyphenyl)-1,1-ethane, bis(4-hydroxyphenyl)-1,1-isobutane, bis(4-hydroxytertiarybutyl-phenyl)2,2-propane, bis(2-hydroxynaphthyl)methane, 1,5-dihydroxynaphthalene, or the like. In many instances, it is desirable to employ such polyepoxides having higher molecular weights and containing aromatic groups. This can be provided by reacting the diglycidyl ether above with a polyphenol such as Bisphenol A, and then further reacting this product with epichlorohydrin to produce a polyglycidyl ether.

Another quite useful class of polyepoxides and polyglycidyl ethers of phenolic novolak resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)-2,2-propane and the like.

There can also be used polyglycidyl esters of polycarboxylic acids.

The polyglycidyl ethers of polyphenols are the preferred polyepoxides for use in the practice of the present invention. Preferred polyglycidyl ethers of polyphenols have molecular weights of at least 350, preferably within the range of 350 to 2000, and epoxy equivalents within the range of 180 to 1000.

Numerous such polyepoxides are commercially available, for example, under the trademark Epon, from Shell Chemical Co., (Houston, Tex.) and Araldite, from Ciba-Geigy (Ardsley, N.Y.).

As would be apparent to one skilled in the art mixtures of polyepoxides may also be employed as the polyepoxide in this invention.

The polycarboxylic acids employed in this invention bear at least two carboxyl groups per molecule, and preferably these acids contain only two carboxyl groups per molecule. Suitable polyacids include saturated or unsaturated, cyclic or acylic, aliphatic or aromatic polycarboxylic acids or a mixture thereof. Acylic aliphatic acids are generally preferred in view of the enhanced flexibility they provide to the cured coatings of the invention.

The preferred dicarboxylic acids have the general formula: HOOC—R—COOH, wherein R is a divalent linking moiety substantially unreactive with the polyepoxide. Particularly preferred are those dicarboxylic acids wherein R is selected from the group comprising a straight or branched alkylene or alkylidene moiety, preferably of about 4-42 carbons, for example, $(CH_2)_n$, wherein n is preferably from about 4 to about 42, and the like or a mixture thereof. Dicarboxylic acids of this character have been found to provide good reactivity with the preferred diepoxides described above and to provide, ultimately, cured coatings of the invention having excellent physical properties, most notably improved flexibility, excellent corrosion protection including steel substrates and higher mixture voltage thus resulting in improved corrosion protection. Preferably the dicarboxylic acid has a number average molecular weight ($\overline{M}_n$) between about 145 and about 1000, more preferably about 570.

Exemplary dicarboxylic acids include adipic acid, 3,3-dimethylpetanedioic acid, benzenedicarboxylic acid, phenylenediethanoic acid, naphthalenedicarboxylic acid, pimelic acid, suberic acid, azelaic acid, sebacic acid, and the like or a compatible mixture of any of them. While dicarboxylic acids according to the above formula can be used, wherein R is an alkylene chain of less than 4 carbons, for example, oxalic acid, malonic acid, succinic acid, glutaric acid and the like, these are less preferred in view of the somewhat lesser degree of flexibility provided thereby. Similarly, preferred aromatic dicarboxylic acids are those wherein the carboxylic groups are more spaced apart, for example, 1,4-benzene-dicarboxylic acid and 2,7-naphthalenedicarboxylic acid.

The most preferred dicarboxylic acids are substantially saturated, acyclic, aliphatic dimer acids, which are well known to the skilled of the art and readily commercially available. These are typically the dimerization reaction products of fatty acids which have from 4 to 22 carbons and a terminal carboxyl group (i.e., forming dimer acids having from 8-44 carbons). Of these, a dimer acid of 36 carbons is most preferred since it provides excellent reactivity with the preferred diepoxides described above. In addition, a dimer acid of 36 carbons is readily commercially available, for example, as Empol 1014 (trademark). Empol 1016 (trademark) and Empol 1018 (trademark), each available from Emery Industries, Inc., Cincinnati, Ohio. It should be recognized that most or all commercially available dimer acids contain some portion of trimer acid, typically, for example, about 5-10% by weight, but in some cases as much as 30% or more, and also contain a usually smaller portion of monocarboxylic acid. As used herein, the term "dimer acid" includes those containing such amounts of these materials. Most useful in the present compositions are products that contain mostly dibasic acid and none of low amounts of tribasic and monobasic acids.

The polycarboxylic acid reactant suitable for use in the present invention may comprise acids having more than two carboxyl groups per molecule, e.g., trimer acids, such as Empol 1040 and Empol 1041 (trademark of and available from Emery Industries Inc.).

While polycarboxylic acids having more than two carboxyl groups per molecule may be employed as the polycarboxylic acid reactant in this invention, when employed, such polycarboxylic acids preferably only comprise a portion of the acid reactant. More preferably, the polycarboxylic acid reactant of the invention of this application comprises at least 50 percent dicarboxylic acid, and most preferably at least 80 percent dicarboxylic acid.

In the practice of preparing the resins of the present invention, the polyepoxide and the polyacid are combined and reacted at elevated temperatures, generally in the presence of a catalyst, in amounts which provide between about 0.1 and about 0.8, preferably between about 0.4 and about 0.6, most preferably about 0.5 acid groups per epoxide group. By means of this reaction, the polyepoxide is chain extended to form an epoxide functional ester. The chain extension reaction is complete when all of the acid groups have been reacted with epoxide groups as can be determined by means such as Infrared Absorption. The chain extension is generally carried out at temperatures of about 120° to 175° C. in the presence of an inert solvent. Catalysts which may be employed to catalyze the epoxy/carboxyl reaction are well known in the art. Among numerous such catalyst, which may be so employed, are the tetraalkyl ammonium salts such as tetramethyl ammonium chloride, tetraethyl ammonium bromide and trimethyl benzyl ammonium chloride as well as metal salts of carboxylic acid, such as potassium octoate or chromium III octoate. Other useful esterification catalysts include metal halide such as chromium trichloride, ferric chloride and aluminum trichloride; mercaptans and thioethers such as octyl mercaptan, dimercapto propanol and dimercapto diethyl ether; tertiary amines such as triethyl amine, pyridine, dimethylandine, quinoline, B-picoline, ethylpyridine, and the like. Still other catalysts known to catalyze carboxyl-epoxide reactions will be apparent to those skilled in this art.

The amine used in the preparation of the resin taught in this application is an organic secondary amine, usually a mono-secondary amine, or mixtures of such amines. Mixtures of secondary amines with minor amounts of primary amines may also be used in this invention, care being taken to avoid gelation. The amines are employed in an amount sufficient to react essentially all of the epoxide groups of the ester formed by chain extending the polyepoxides. Reaction of the amine with the chain extended polyepoxide occurs by the amine opening of the epoxide ring thereby forming a higher amine and a secondary hydroxyl group. The reaction is generally carried out at an elevated temperature of from about 100°-150° C., also in the presence of solvent.

Primary amines which may be employed in forming the resin of this invention include, but are not limited to, 2-ethylhexylamine, 2,4-diisopropylhexylamine, and nonylamine.

Exemplary of the wide variety of secondary amines, which may be employed in forming the resin of this invention are di-lower alkyl amines and hydroxyl containing di-lower alkyl amines in which the alkyl groups contain 1 to 4 carbon atoms, such as dimethylamine, dipropylamine, and methyl ethanol amine, dimethylamine and the like. Part of the amine reacted with the polyepoxide can be a polyamine ketimine derivative. The ketimine derivatives can be virtually any polyamine capable of reacting with an epoxy group having at least one secondary amine group and containing primary amine groups. The preferred polyamines are the alkylene polyamine and substituted alkylene polyamines. Especially preferred polyamines are selected from those having the following formula: $H_2NRNHRNH_2$, where R is a difunctional aliphatic group containing from about 2 to 28 carbon atoms. R may represent the same or different radicals in any one polyamine compound. Inert and non-interfering groups may be present on the group R.

Particularly preferred polyamines are those having the formula set forth above wherein R is an aliphatic hydrocarbon group. It is preferred that R be an alkylene group of 2 to 6 carbon atoms. Typical amines which may be used are diethylene triamine, triethylene tetramine, and so forth, and the corresponding propylene, butylene and higher alkylene amines. Other amines which may be employed are primary-secondary amines such as N-amino-ethyl piperizine. Teachings relative such amines are found in U.S. Pat. No. 4,148,772, to Marchetti et al, which teachings are hereby incorporated by reference.

As has been taught above, optionally inert solvents may be employed in forming the resin of the invention of this application. Suitable solvents which may be so employed include, but are not limited to, alcohols, ethers, ketones, as well as aromatic hydrocarbons and phthalates. Exemplary of the alcohols are butanol, isopropanol, hexanol, etc. Ethers which may be used include propylene glycol, methyl ether, dipropylene glycol, methyl ether and ethylene glycol ether acetate. Ketones which may be so employed include methyl butyl ketone, methylisobutyl ketone, methylpropyl ketone, methylethyl ketone, etc. Useful aromatic solvents include xylene, toluene, ethyl benzene, etc. Phthalates useful as solvents in this invention include dimethyl dipropyl, dibutyl, and dioctyl phthalates. Some of such solvents may also employed in this invention.

The resins of the coating compositions of the present invention are crosslinked by means of a crosslinking agent which may be included in the resin molecule or more preferably is codeposited with the resin from the coating composition bath. The preferred curing agents are capped isocyanate derivatives. The polyisocyanates should be capped so that they will not react with the active hydrogens of the coating composition resin (such as hydroxyl and primary amino hydrogen functionality) until the coated article is heated to a high temperature sufficient to unblock the blocked isocyanate and cure the coating.

The capped or blocked isocyanates which may be employed in the compositions of the invention may be any polyisocyanate where the isocyanato groups have been reacted with a compound, so that the resultant capped isocyanate is stable to active hydrogens at room temperature but reactive with active hydrogens at elevated temperature, usually between about 90°-200° C.

The polyisocyanate curing agent can be used in two similar ways. The polyisocyanate can be fully capped, that is, no free isocyanate groups remain, and then added to the chain-extended amine-containing resin to form a two-component system. Or, the polyisocyanate can be partially capped, for example, half-capped diisocyanate so that the reactive isocyanate groups remain. The partially capped isocyanate can then be reacted with the epoxide functional esters (prior to their reaction with the secondary amines) through active hydrogen functionalities, i.e., hydroxyl, present in the epoxide functional esters under conditions which will not unblock the isocyanate. This reaction in effect fully caps the isocyanate making it a part of the polymer molecule and a one-component system. The two component system is preferred.

Usually, the reaction of the semi-capped polyisocyanate and the active hydrogen functionality in the epoxide functional esters is conducted at low or moderate temperature, which is generally about 150° C. or less, to preserve the capped isocyanate groups in order to avoid gelation and to retain latent crosslinking sites. Solvent, particularly a water-miscible one such as an ether, ester or ketone, may be used. Usually the reaction is conducted in the presence of a catalyst for urethane formation at a temperature between about 60° C. and 120° C. Whether partially capped or fully capped, sufficient polyisocyanate is present in the coating system so that there are about 0.1 to about 1.0 urethane groups for each active hydrogen.

In the preparation of the capped organic polyisocyanate, any suitable organic polyisocyanate may be used. Representative exampls are aliphatic compounds such as trimethylene, tetramethylene, hexamethylene and butylidene diisocyanate; cycloalkylene compounds such as 1,4-cyclohexane diisocyanate; aromatic compounds such as p-phenylene diisocyanate; aliphatic aromatic compounds such as 4,4'-diphenylene methane diisocyanate, 2,4- or 2,6-tolylene diisocyanate or mixtures thereof. Higher polyisocyanates can be employed such as triisocyanates. Examples include triphenylmethane-4,4',4''-triisocyanate and 2,4,6-triisocyanate toluene.

Any suitable aliphatic, cycloaliphatic, aromatic alkyl mono-alcohol and phenolic compound may be used as a capping agent in accordance with the present invention. These include, for example: lower aliphatic alcohols containing from 1 to 4 carbon atoms, such as methanol, ethanol and n-butyl alcohol; cycloaliphatic alcohols such as cyclohexanol; aromatic-alkyl alcohols such as phenylcarbinol and methylphenylcarbinol; and phenolic compounds such as phenol itself and substituted phenols in which the substituents do not adversely affect the coating operations. Examples of the latter include cresol, nitrophenol, chlorophenol and ethylphenol. Minor amounts of even higher molecular weight, relatively non-volatile monoalcohols may be used, if desired, to serve as plasticizers in the coatings provided by this invention.

Additional capping agents include oximes, such as methyl ethyl ketoxime, acetone oxime and cyclohexanone oxime, and lactams such as epsilon-caprolactam. Use of oximes and lactams is particularly desirable because the polyisocyanates blocked with these agents unblock and react at relatively low temperatures.

The reaction between the organic polyisocyanate and a capping agent is usually exothermic; therefore, the polyisocyanate and the capping agent are preferably admixed at temperatures no higher than 80° C. and preferably below 50° C. to minimize the exotherm effect.

Particularly preferred fully capped isocyanates for use in crosslinking the resin of this invention (as a two-component system) are those taught in applications U.S. Ser. Nos. 334,863 and 334,864 filed Dec. 28, 1981, to Kordomenos et al and entitled, respectively, "Aqueous Compositions Comprising Blocked Polyisocyanate Crosslinking Agent" and Aqueous Compositions Comprising Blocked Isocyanate Crosslinking Agent", the teaching of which applications relative these crosslinking agents is hereby expressly incorporated by reference. By employing these crosslinking agents with the resin of this application, a lower cure temperature can be employed for the coating composition than that which must be used with conventionally blocked isocyanates.

While it is preferred to employ capped isocyanates as the crosslinking agent for the resin of this invention; other compounds may be employed to crosslink the resin, for example, aminoplast and phenoplast resins. Exemplary of such crosslinking resins are melamines, such as those sold by American Cyanamid Company, Wayne, N.J., under the tradename "Cymel". In particular, Cymel 301, 303, 325, 1130, 1156, which are alkylated melamine resins, are useful in this invention.

Neutralization of the resin products is accomplished by reaction of all or part of the amino groups with water-soluble acids, such as formic, proponic, lactic, acetic and butanoic, to just name a few, with acetic acid being preferred. The extent of neutralization depends upon the particular resin and it is only necessary that sufficient acid be added to solubilize or disperse the resin.

Optionally, other such commonly employed materials may be included in the coating composition comprising the dispersed resin disclosed in this application. These optional constituents are generally mixed into the resin reaction mixture prior to the addition of the water soluble acid, although they may be added after the addition of the acid. Such optional constituents include, but are not limited to, plasticizers, pigments, surfactants, wetting agents, and catalysts. Such plasticizers include dioctyl phthalate, polyhydroxy polyethers (e.g., Eponol 52B40 or Eponol 53B40, Shell Chemical Company, Houston, Tex.), hydroxy acrylate (e.g., G-Cure 868, Rohm & Haas Company, Philadelphia, PA) etc. Pigments are generally included in the coating composition bath and may be of any type, comprising, for example, iron oxides, lead oxides, strontium chromate, carbon black, coal dust, titanium dioxide, talc, barium silfate, as well as color pigments such as cadmium yellow cadmium red, chromium yellow and the like. Selection of optimal amounts of these materials which may be included in the coating bath is within the skill of those in the art.

It is sometimes necessary with the blocked isocyanate, in order to insure rapid and complete cure, to have present in the coating a catalyst for urethane formation. The amount of catalyst employed is that amount which effectively promotes reaction in the deposited film, and selection would be within the skill of one in the art. However, if curing temperatures after deposition are high enough, catalyst may not be needed. Also, if a proper blocking agent for the isocyanate is employed, for example, oximes and phenols, catalyst may not be needed.

Besides water, the aqueous medium may contain a coalescing solvent. The use of coalescing solvents provides in some instances for improved deposited film appearance. These solvents include hydrocarbons, alcohols, esters, ethers, and ketones. The preferred coalescing solvents include monoalcohols, glycols and polyols as well as ketones and ether alcohols. Specific coalescing solvents include isopropanol, butanol, isophorone, 4-methoxy-methylpetanone-2, ethylene and propylene glycol, the monoethyl, monobutyl and monohexyl ethers of ethylene glycol and 2-ethyl hexanol. The amount of coalescing solvent is not unduly critical and is generally between about 0.1 and 40 percent by weight. preferably between about 0.5 and about 25 percent by weight based on total weight of the aqueous medium.

The coatings comprising dispersed resin of this invention may be coated onto metal substrates by cathodic electrodeposition methods well known to one skilled in the art. Generally, voltages of between about 50 and about 500 volts are employed for a time of between about 1 and about 4 minutes so as to provide coatings of between about 10 and about 40 microns. After electrodeposition, the coating is cured, usually by baking at elevated temperatures. Temperatures from about 135°–200° C. for about 15 to about 30 minutes are typical. Selection of optimal coating conditions would be well within the skill of one in the art. Those described above are merely suggestive to those typically employed and are not meant to limit the invention of this application.

The invention will be further understood by referring to the following detailed examples. It should be understood that the specific examples are presented by way of illustration and not by way of limitation.

INDUSTRIAL APPLICABILITY

It should be apparent from the foregoing, that the resins of this invention may be employed in forming cathodically electrodepositable coating compositions which find application, as for example, primer or topcoat coatings for metals.

EXAMPLE I

Into a 5 liter reactor were charged 1488 g of 2,4 toluene diisocyanate. 1114 gms of 2-ethyl hexanol were added in a period of two hours under nitrogen blanket, keeping the reaction temperature below 43° C. The product was kept at 43° C. for an additional one-half hour and then heated to 60° C. at which point 383 g of trimethylol propane were added. After the initial exotherm the batch was kept at 115° C. until all the isocyanate groups were consumed as indicated by infrared scan. The batch was then thinned with 1279 gms of 2-butoxy-ethanol, (Crosslinker A).

EXAMPLE II

Into a 5 liter reactor were charged 1205 g of 2,4 toluene-diisocyanate. 784 g of E-caprolactam were added in a period of one hour. After the end of the addition, the batch was kept at 43° F. for 2 hours. At this point the percent NCO conversion was found to be 48.1 by titration method. 410 gms of methyl diethanol amine were added in a period of 45 minutes. The exotherm brought the temperature up to 115° C. An IR scan showed no NCO left after the end of the addition. The batch was thinned with 800 g of 2-butoxyethanol. (Crosslinker B).

EXAMPLE III

Into 2 liter reactor were charged 334 g of a trifunctional aliphatic isocyanate commercially available from Mobay Chemical Co., (Pittsburgh, Pa.) under the trademark L-2291. The temperature was raised to 65° C. and 218 g of benzyl triazole was added in a 2 hour period. One-half hour after the end of the addition, an IR scan showed no NCO left in the product and the batch was thinned with 184 g of 2-butoxyethanol, (Crosslinker C).

EXAMPLE IV

Into a 2 liter reactor were charged 966 parts of diglycidyl-ether of Bisphenol A (Epon 829, trademark of and available from Shell Chemical Co., Houston, Tex.), 260 parts of Bisphenol A and 382 parts of Empol 1016 (A dimer acid commercially available from Emery Ind.). The mixture was heated under nitrogen to 160° C. At this point an exothermic reaction brought the temperature up to 199° C. The batch was cooled down to 138° C. At this point the reaction product had an epoxy equivalent weight of 1200, viscosity S (50% solution in 2-butoxyethanol) and acid value zero. To the reaction mixture were added 1220 parts of crosslinker A (Example I), 103 parts of 72% nonvolatile solution of isobutyl diketimine of diethylene triamine in methyl isobutyl ketone and 78 parts of methyl ethanol amine. The reaction mixture was kept at 115° C. for one hour and then 168 parts of hexyl cellosolve were added. The batch was then charged into another reactor and dispersed into a mixture of 45 parts of acetic acid, 40 parts of a surfactant [surfactant composition: 31% Amine C (Ciba Geigy), 31% Surfynol 104 (Air Products and Chemicals, Allentown, Pa.), 5% acetic acid and 33% butyl cellosolve] and 1621 parts water. After the batch was completely dispersed, 2200 parts of water were added.

EXAMPLE V

Into a 2 liter reactor were charged 449 g of Epon 829 (trademark), 166 g of Empol 1024 (Trademark) and 130 gms of Bisphenol A. The reaction mixture was heated up to 154° C. and the exotherm brought the temperature up to 199° C. After 30 minutes the batch was cooled to 138° C. and 282 g of Crosslinker A (Example I), 43 g of diketimine of Example IV and 34 g of methyl ethanol amine were added. The reaction mixture was kept at 115° C. for one hour and then 396 g of Crosslinker B (Example II), and 84 g of hexyl cellosolve were added. The batch was dispersed into a mixture of 21 g of acetic acid 19 g of surfactant (described in Example IV) and 800 g of water. After the batch was completely dispersed, additional water was added to thin the batch to 37% NV.

EXAMPLE VI

Into a suitable reactor were charged 966 parts of Epon 829 (trademark), 260 parts of Bisphenol A and 128 parts of azelaic acid. The mixture was heated under nitrogen to 160° C. At this point an exothermic reaction brought the temperature up to 199° C. The mixture was kept at this temperature for one hour and then cooled down to 138° C. The acid value was found to be zero. To the reaction mixture were then added 100 parts of butyl cellosolve, 103 parts of diketimine of Example IV, and 178 parts of methyl ethanol amine. The reaction mixture was kept at 115° C. for one hour and then 1081 parts of crosslinker of Example III were added. The batch was then dispersed into a mixture of 40 parts acetic acid 37 parts of surfactant of Example IV and 1320 parts of water. After the batch was completely dispersed it was thinned down to 37% NV with additional water.

EXAMPLE VII 696 parts of 2,4 toluene diisocyanate were charged into a suitable reactor. 357 parts of N-methyl diethanol amine were added dropwise. After 30 minutes the temperature was 50° C. and 100 parts of acetone were added. After 30 minutes the addition was finished and another 100 parts of acetone were added. At this time 52 parts of neopentyl glycol, were added and the reaction mixture was kept at 50° C. for 30 minutes at which time 87 parts of methyl ethyl ketoime were added dropwise in a period of 20 minutes. After the addition was finished the mixture was kept at 45° C. for 30 minutes and then cooled down to room temperature. 200 parts of this resin were mixed with 400 parts of butyl cellosolve, 200 parts of aluminum silicate, 36 parts of lead silicate, 30 parts of carbon black. The resultant slurry was then ground to a Hegman No. 7 reading in a suitable mill.

EXAMPLE VIII

Electrodeposition baths were individually prepared by mixing 1500 parts of the dispersed resin batch of Examples IV, V, and VI with 400 parts of the millbase of Example VII. In each bath 2300 parts of water were added. Steel panels were coated from each of these baths and had the following properties:

| Properties | Resin of Example IV | Resin of Example V | Resin of Example VI |
| --- | --- | --- | --- |
| Coating Voltage for 0.7 mil thickness | 320 | 300 | 300 |
| Baking Schedule | 182° C. × 20 min. | 163° C. × 20 min. | 149° C. × 20 min. |
| Throwing Power | 13 | 12 | 12 |
| Appearance | Excellent | Excellent | Good |
| Solvent Resistance in MEK | Excellent | Excellent | Excellent |
| Salt Spray phosphated Steel 340 hrs. | No creepage at scribe | No creepage at scribe | No at scribe |

EXAMPLE IX

Into a suitable reactor are charged 1488 parts of 2,4-toluene diisocyanate. Eleven hundred fourteen (1114) parts of 2-ethylhexanol are added in a period of two hours under nitrogen blanket, keeping the reactor temperature below 45° C. The product was kept at 45° C. for one additional 1½ hours, and then was thinned with 650 parts of 2-butoxy ethanol. (Half-blocked diisocyanate).

In another reactor are charged 966 parts of Epon 829, 260 parts Bisphenol A and 382 parts of Empol N-1016. The mixture was heated under nitrogen to 160° C. At this point an exothermic reaction takes place that brings the temperature up to 200° C. The mixture is kept at this temperature for 30 minutes and then cooled to 115° C. At this point 760 parts of the half-blocked 2,4-toluene diisocyanate solution (described above) are added. The reaction mixture kept at 115° C. until all the isocyanate groups are consumed as indicated by an infrared scan. To the reaction mixture are then added 103 parts of diketimine of Example IV and 78 parts of methyl ethanol amine. The temperature is kept at 115° C. for another hour and then 115 parts of hexyl cellusolve are added. The batch is then charged into another reactor and dispersed into a mixture of 39 parts of acetic acid, 37 parts of surfactant of Example IV and 1420 parts of water. After the batch is completely dispersed, it is thinned to 37% nonvolatile with additional water. An electrodeposition bath is prepared by diluting 1400 parts of this dispersed resin with 200 parts of water. Phosphated steel panels are coated at 225 volts for 2 minutes to yield smooth, hard films of approximately 13–16 microns thickness when cured for 20 minutes at 120° C.

In view of the disclosure, many modifications of this invention will be apparent to those skilled in the art. It is intended that all such modifications which fall within the true scope of this invention be included within the terms of the appended claims.

What is claimed is:

1. A water dispersible, cathodically electrodepositable resin characterized in that said resin comprises the reaction product of:
(A) epoxide functional esters formed by chain extending
    (a) polyepoxide having, on average, at least two epoxide group per molecule and a molecular weight of at least 350; with
    (b) polycarboxylic acid bearing at least two carboxyl groups per molecule, wherein said polyepoxide and said polycarboxylic acid are reacted in amounts which provide between about 0.1 and about 0.8 acid groups per epoxide group; and
(B) secondary amines, wherein said ester and said amines are reacted in amounts sufficient to react essentially all of said epoxide groups of said ester with said amines,
said reaction product being dispersible in water with the aid of water soluble acid to provide cationic groups in said resin.

2. A resin according to claim 1, wherein said polyepoxide is a diepoxide.

3. A resin according to claim 2, wherein said epoxide groups of said diepoxide are terminal epoxide groups.

4. A resin according to claim 1, wherein said polyepoxide has a molecular weight of between about 350 and about 2000.

5. A resin according to claim 1, wherein said polycarboxylic acid comprises dicarboxylic acid.

6. A resin according to claim 5, wherein said dicarboxylic acid is aliphatic dimer acid which contains between about 8 and about 44 carbon atoms.

7. A resin according to claim 5, wherein said polycarboxylic acid comprises at least 50% dicarboxylic acid.

8. A resin according to claim 1, wherein said polycarboxylic acid and said polyepoxide are reacted in amounts which provide between about 0.4 and about 0.6 carboxylic acid groups per epoxide group.

9. A resin according to claim 8, wherein said polycarboxylic acid and said polyepoxide are reacted in amounts which provide about 0.5 carboxylic acid groups per epoxide group.

10. A resin according to claim 1, wherein said epoxide functional esters, prior to being reacted with said amines, are reacted with partially blocked isocyanate.

11. A resin according to claim 10 wherein said partially blocked isocyanate is reacted with said epoxide functional ester in an amount which provides at least about 0.1 to about 1 urethane groups for each active hydrogen.

12. A cathodically electrodepositable coating composition, characterized in that it comprises an aqueous dispersion of said resin of claim 1 dispersed in water with the aid of acid.

13. A cathodically electrodepositable coating composition according to claim 12, wherein said composition further comprises a crosslinking agent comprising fully capped isocyanates.

14. A cathodically electrodepositable coating composition according to claim 13, wherein said fully capped isocyanate is present in said coating composition in an amount which provides at least about 0.1 to about 1.0 urethane groups for each active hydrogen.

* * * * *